Patented Jan. 12, 1954

2,666,080

UNITED STATES PATENT OFFICE 2,666,080

METHOD OF PRODUCING PROTEIN HYDROLIZATE FROM POTATOES AND POTATO WASTE

Paul A. Xander, Nescopeck, Pa., assignor to Wise Potato Chip Co., a corporation of Pennsylvania No Drawing. Application November 3, 1950, Serial No. 194,036

4 Claims. (Cl. 260—527)

This invention relates to a method of producing a mixture of amino acids using potatoes and raw potato waste as the source materials.

The primary object of this invention is to provide a process of extracting virtually all of the amino acids from potatoes and raw potato waste wherein the resultant product is a solid or crystalline mixture of the amino acids in purified form and substantially free of acid, sugars, and undesirable cations.

Another important object of this invention is to provide a process of producing a mixture of amino acids utilizing potatoes and raw potato waste as the source materials, which process is capable of being carried out efficiently and continuously to produce an exceptionally pure mixture of amino acids which results from the hydrolysis or degradation of the protein fraction in the raw tuber including tuberin, a globulin protein which is also completely hydrolyzed in the process.

Another important object of this invention is to provide a process of the character described in which the sequential operation can be effectively and properly controlled at each step so that the quality of the end product will be substantially uniform.

And yet another object of this invention is to provide a purified amino acid product which, besides having neutritional benefits, can also be employed to substantially improve the color and flavor of potato slices fried in animal fat or fats, or vegetable oil or oils, hydrogenated or non-hydrogenated, for making potato chips.

Broadly, the present process comprises the maceration or grinding of raw potatoes or raw potato waste and the separation of the solids from the liquid fraction. Thereafter, the liquid fraction is treated to remove the sugars and the de-sugared liquid fraction is hydrolyzed, whereby the proteins are degraded to amino acids. The solution containing the amino acids is treated with an ion exchange resin to remove the acid used for hydrolyzing the proteins and is further treated with another ion exchange resin to remove undesirable cations and simultaneously produce the sodium salts of the amino acids. The volume of the purified hydrolyzate or amino acid mixture is reduced considerably under high vacuum and at low temperatures and, finally, the concentrated liquid is dried under high vacuum and at low temperatures to produce a solid or crystalline mixture of the sodium salts of the amino acids.

While the present process may be applied to raw potatoes as a source material, it is preferred that raw potato waste be employed, the latter being a term in the art referring to the material including culls and wash water obtained from the slicing and spotting operations in the potato industry. While the composition of a raw potato varies with the varity of the potato and the location in which it is grown, an average composition for raw potatoes includes the following ingredients in percentage by weight:

| | Percent |
|---|---|
| Water | 75 to 80 |
| Sugar | 0.0 to 4 |
| Proteins | 2 to 4 |
| Carbohydrates | 16 to 20 |

An approximate quantitative analysis of the protein fraction of the raw tuber shows 45% by weight of free amino acids consisting of:

| | Percent |
|---|---|
| Aspartic acid | 6 |
| Glutamic acid | 6 |
| Lysine | 4 |
| Asparagine | 5 |
| Glycine | 2 |
| Threonine | 2 |
| Arginine | 11 |
| Tyrosine | 1 |
| Tryptophane | 2 |
| Valine and methionine | 6 |

The remaining 55% by weight of the total protein fraction consists of Tuberin, a globulin protein.

Inasmuch as the present process also effects degradation or hydrolyzation of the Tuberin and the Tryptophane and Tyrosine are destroyed in the hydrolization, an approximate representative analysis of the hydrolizate from raw tubers and tuber waste and comprising the end product of the present process follows, the ingredients being stated in percentage by weight:

| | Percent |
|---|---|
| Glutamic acid | 26 |
| Aspartic acid | 20 |
| Glycine | 4 |
| Alanine | 2 |
| Leucine | 1 |
| Threonine | 3 |
| Lysine | 6 |
| Histidine | 15 |
| Methionine | 6 |
| Asparagine | 4 |
| Arginine | 6 |
| Valine | 6 |
| Phenylalanine | 1 |

The raw potatoes and potato waste, including culls and wash water from the slicing and spotting operations, are fed into a hammer mill or pulper, where they are reduced to a 90 or 100 mesh pulp. The solids are removed, preferably by centrifuging, and the proteins, which are soluble in water, together with any other solubles such as carbohydrates, mineral salts, acids, enzymes, and any starch which might have passed through the mesh, are flowed as a solution into a stainless steel tank equipped with an agitator. The solution is a dark brown colored liquid with a pH of 5.5 to 6.5. This solution is desugared in a manner soon to appear and there are several reasons why the sugar must be removed at this stage. In the first place, the presence of sugars and carbohydrates as impurities will substantially interfere with the proper hydrolysis of the proteins which must be carried on at high temperatures in the presence, preferably, of mineral acids. The presence of these carbohydrates and sugars in the hydrolysis stage increases the time required to effect substantially complete hydrolysis, decreases the yields of amino acids, and contaminates the recovered amino acids. Furthermore, if the carbohydrates and sugars are not removed before hydrolysis, they are difficult to remove by ion exchange resins after hydrolysis and remain as a contaminant in the amino acid composition. Since the amino acid composition must be reduced considerably in volume and then dried to produce the solid end product, the presence of the carbohydrates and sugars will substantially interfere with the efficiency of the evaporation and drying steps. And lastly, the presence of the carbohydrates and sugars as contaminants in the recovered amino acid composition is undesirable when the composition is employed to augment the color and flavor of the potato slices used to produce potato chips.

While several methods may be employed for removing the sugars and carbohydrates from the above-mentioned liquid fraction in the stainless steel tank, it is preferred that they be precipitated by the addition of an alkaline earth oxide or hydroxide, such as calcium oxide or hydroxide and barium oxide or hydroxide. While the solution in the stainless steel tank is kept under continuous agitation, freshly ground calcium oxide is added in the ratio of 2 pounds per 100 gallons of the solution, the calcium oxide being converted to calcium hydroxide, which in turn reacts with the sugars to form the insoluble calcium saccharide and water. When the precipitation of the sugars and carbohydrates is complete, the resultant solution attains a pH of 8.0 to 10.0, the precipitation being conducted at conventional room temperatures.

The insoluble dark gray precipitate which has formed in ten to thirty minutes is removed by centrifuging or filtering and the dark reddish brown filtrate is passed into a digesting tank equipped with a reflux-type condenser and agitator. At this stage, the desugared protein-containing solution is hydrolyzed to the amino acids in the presence of a mineral acid such as hydrochloric or sulphuric acid. Hydrochloric acid is preferred and is added as concentrated hydrochloric acid at the rate of 5.0 gallons per 100 gallons of liquid, and the mixture is digested at 212° F. for approximately 6 to 18 hours at atmospheric pressure. The addition of hydrochloric acid to the solution precipitates the Tuberin which is gradually hydrolyzed to amino acids as the digestion proceeds.

Before the amino acids can be recovered from the hydrolizate, it is necessary to purify the hydrolizate, which, at the end of the hydrolysis, has a pH of 0.5 to 3.5. It is necessary to remove the hydrochloric acid which is present in from 1.0 to 2.75% by weight of free hydrogen chloride along with lesser quantities of certain inorganic salts, particularly calcium chloride. The removal of these and other impurities is effected in the present process by the novel use of certain ion exchange resins. After the hydrolizate is passed through cooling coils and filtered to remove all insoluble substances, it is passed into an anion exchange resin column charged with a weakly basic, modified amine type anion exchange resin, Amberlite IR–4B, manufactured by the Rohm and Haas Company. This resin removes the acidic substances such as hydrochloric acid by exchanging the acid with hydroxyl radicals. This resin is not only capable of removing whole molecules of acid but of effectively splitting salts other than neutral salts so that the effluent from the anion exchange column contains amino acids and the hydroxyl form of the inorganic cations, the solution having a pH of approximately 6.8 to 7.2.

As pointed out hereinabove, the presence of inorganic cations, especially calcium, interfere with the proper evaporation and drying of the resultant product and also affect the flavor of the final product, and, accordingly, it is necessary that these substances be removed. This is accomplished by passing the de-acidified hydrolizate through a column of a suitable cation exchange resin and Amberlite IR–120, a nuclear sulfonic-acid type exchanger, manufactured by the Rohm and Haas Company, is employed to good advantage. In this column, the cation exchange resin absorbs calcium and other inorganic cations in exchange for sodium ions. Sodium reacts with the free hydroxyl groups to form strongly basic sodium hydroxide which, in turn, immediately reacts with the amino acids to yield their sodium salts and water. The final effluent is completely free of hydrochloric acid and undesirable inorganic salts and yields a high quality hydrolizate. The loss of amino acids during purification by the cation and anion exchange resins due to absorption has been found to be negligible. Of course, the resins may be readily regenerated and re-used many times.

From the resin exchange columns, the amino acid solution is conducted into a vacuum evaporator, where, under approximately 26 inches of vacuum and at a temperature ranging from 65 to 80° C., the solution is concentrated to approximately 5 to 15% of its original volume. The concentrate at this point is dark brown in color and has a pH of 5.5 to 6.5.

This concentrate contains a very small fraction of black humin, a proteinaceous compound resulting from some degradation of the protein molecule, and as a result must be filtered in order to remove this humin before the final drying process. After filtration and clarification, the concentrate is passed into a high vacuum double-drum type dryer or a high vacuum shelf-type dryer, where it is crystalized at a temperature of 80 to 90° C. The resultant amino acid composition is a stable, hygroscopic, crystalline material, tan to brown in color.

A typical example of the process is given hereinafter to illustrate the mode of operation of the invention.

EXAMPLE

Approximately one kilogram of whole raw Florida tubers was agitated with a small quantity of tap water in a Waring blendor for about one minute. This was repeated several times until the desired amount of raw slurry was obtained. The suspended solid matter in the slurry was removed by passing it through a 100-mesh stainless steel liner in an 8-inch bronze basket-type centrifuge at a speed of 2500 R. P. M. The liquid fraction, approximately one liter, was treated with 5 grams of finely ground calcium oxide under constant agitation for five minutes. The precipitated saccharides were removed by filtration through a Beuchner funnel with the aid of a diatomaceous filter aid and suction. The pH at this point was approximately 8.5 and the procedure was carried out at room temperature at 70° F. and 70% relative humidity.

The filtrate was then treated with 5% of its volume of concentrated hydrochloric acid, at which point the Tuberin precipitated. The entire mixture was refluxed for a total of eight hours at atmospheric pressure and at a temperature of approximately 212° F. The Tuberin hydrolized and the pH at this point was 1.3. After the darkened insoluble humin was filtered off through a Beuchner funnel and Gooch asbestos, the filtrate was then passed through an anion exchange column of Amberlite IR-4B and a second column containing Amberlite IR-120. The effluent showed a pH of 6.3 and was free from hydrochloric acid and other mineral acids and mineral salts, such as calcium chloride. The amino acids were present in solution in the form of their sodium salts.

The solution was concentrated under a reduced pressure of 27 inches of mercury at a boiling point of 60° C. to approximately 15 milliliters, at which point a substantial amount of crystallization occurred. The material was then evaporated in a vacuum oven at 85° C. and 29 inches of mercury, and the final product was a tan, semi-crystalline mass with a sweet odor and a very appealing flavor. A 2% solution in water indicated a pH value of 6.8 and qualitative analysis showed the presence of the following amino acids: Glutamic, Aspartic, Arginine, Glycine, Valine, Alanine, Leucine, Threonine, Lysine, Histidine, Methionine, Phenylalanine, and Asparagine. The yield was approximately 1.78% by weight of the original quantity of material.

Thus, it will be seen that a novel process is provided for producing a solid mixture of amino acids from raw potatoes and raw potato waste in purified form, the product having exceptional value in imparting flavor and color to potato slices which are subsequently fried in animal fat or fats, or vegetable oil or oils, hydrogenated or non-hydrogenated, to produce potato slices. While a preferred embodiment of the invention has been described hereinabove, it will be understood that one skilled in the art may make minor variations in the process and product without departing from the spirit of the invention and the scope of the appended claims.

Having described the invention, what is claimed as new is:

1. A process for producing protein hydrolizate from potatoes and potato waste which comprises forming a slurry of the potato material in water and then separating suspended solid matter from the liquid fraction, adding to the liquid fraction a precipitant selected from the group consisting of the alkaline earth metal oxides and hydroxides to precipitate sugars, separating the resultant precipitate from the desugared liquid fraction and digesting the latter with a mineral acid to hydrolyze proteins to amino acids, passing the hydrolyzed liquid fraction through an anion exchange resin to remove the mineral acid, thereafter passing the liquid fraction through a cation exchange resin and therein exchanging alkaline earth metal cations for sodium ions and forming sodium salts of the amino acids, absorbing the inorganic compounds in said cation exchange resin while withdrawing therefrom a solution of said amino acid salts, and concentrating the withdrawn solution to a product of high amino acid salt content.

2. A process for producing protein hydrolizate from potatoes and potato waste which comprises forming a slurry of the potato material in water and then separating suspended solid matter from the liquid fraction, adding to the liquid fraction a precipitant selected from the group consisting of the alkaline earth metal oxides and hydroxides to precipitate sugars, separating the resultant precipitate from the desugared liquid fraction and digesting the latter with a mineral acid to hydrolyze proteins to amino acids, passing the hydrolyzed liquid fraction through an anion exchange resin to remove the mineral acid, thereafter passing the liquid fraction through a cation exchange resin and therein exchanging alkaline earth metal cations for sodium ions and forming sodium salts of the amino acids, absorbing the inorganic compounds in said cation exchange resin while withdrawing therefrom a solution of said amino acid salts, concentrating said solution by evaporation to approximately 5 to 15% of its original volume, thereby forming a concentrate containing a small amount of black humin, filtering the latter from the concentrate, and then drying the concentrate to a solid and substantially pure mixture of sodium salts of amino acids.

3. The process of claim 1 further characterized in that said precipitant is calcium oxide.

4. The process of claim 1 further characterized in that said mineral acid is hydrochloric acid.

PAUL A. XANDER.

References Cited in the file of this patent

UNITED STATES PATENTS

| Number | Name | Date |
|---|---|---|
| 2,281,025 | Cottrell et al. | Apr. 28, 1942 |
| 2,375,164 | Bennett | May 1, 1945 |
| 2,375,165 | Nees et al. | May 1, 1945 |
| 2,386,926 | Block | Oct. 16, 1945 |
| 2,387,824 | Block | Oct. 30, 1945 |
| 2,415,558 | Hesler et al. | Feb. 11, 1947 |
| 2,429,666 | Block | Oct. 28, 1947 |
| 2,528,047 | Fitch | Oct. 31, 1950 |

OTHER REFERENCES

Sjollema et al., Z. Physiol. Chem., vol. 76, pp. 368-84 (1912).

Kroner et al., Chem. Abstracts, vol. 31, pp. 6916 (1937).

Groot, Chem. Abstracts, vol. 42, p. 6018 (1948).